United States Patent
Shinozaki

(10) Patent No.: US 12,482,275 B2
(45) Date of Patent: Nov. 25, 2025

(54) ELECTRONIC DEVICE, INFORMATION PROCESSING DEVICE, ALERTNESS LEVEL CALCULATING METHOD, AND ALERTNESS LEVEL CALCULATING PROGRAM

(71) Applicant: KYOCERA Corporation, Kyoto (JP)

(72) Inventor: Takayuki Shinozaki, Tokyo (JP)

(73) Assignee: KYOCERA Corporation, Kyoto (JP)

( * ) Notice: Subject to any disclaimer, the term of this patent is extended or adjusted under 35 U.S.C. 154(b) by 407 days.

(21) Appl. No.: 18/004,295

(22) PCT Filed: Jul. 1, 2021

(86) PCT No.: PCT/JP2021/025042
§ 371 (c)(1),
(2) Date: Jan. 4, 2023

(87) PCT Pub. No.: WO2022/014354
PCT Pub. Date: Jan. 20, 2022

(65) Prior Publication Data
US 2023/0222816 A1    Jul. 13, 2023

(30) Foreign Application Priority Data
Jul. 17, 2020  (JP) ................................. 2020-123234

(51) Int. Cl.
*G06V 20/59* (2022.01)
*G06T 7/70* (2017.01)
*G06V 10/774* (2022.01)

(52) U.S. Cl.
CPC .............. *G06V 20/597* (2022.01); *G06T 7/70* (2017.01); *G06V 10/774* (2022.01); *G06T 2207/30201* (2013.01); *G06T 2207/30268* (2013.01)

(58) Field of Classification Search
None
See application file for complete search history.

(56) References Cited

U.S. PATENT DOCUMENTS

| | | | |
|---|---|---|---|
| 8,085,140 B2 | 12/2011 | Mochizuki et al. | |
| 2015/0339589 A1 | 11/2015 | Fisher | |
| 2017/0153699 A1* | 6/2017 | Tsuda | G06F 3/0304 |

(Continued)

FOREIGN PATENT DOCUMENTS

| | | |
|---|---|---|
| JP | 2015-207163 A | 11/2015 |
| WO | 2008029802 A1 | 3/2008 |

*Primary Examiner* — Leon Viet Q Nguyen
(74) *Attorney, Agent, or Firm* — Studebaker Brackett PLLC

(57) ABSTRACT

An electronic device 10 includes an image-capturing unit 11, a line-of-sight detector 12, and a controller 14. The image-capturing unit 11 generates an image corresponding to the view by performing image capturing. The line-of-sight detector detects a line of sight of a subject with respect to the view. The controller 14 functions as a first estimator 15. The first estimator 15 is capable of estimating a first heat map based on the image. The controller 14 calculates the alertness level of the subject based on the first heat map and the line of sight of the subject. The first estimator 15 is constructing using learning data obtained by machine learning the relationship between a learning image and a line of sight of a training subject when an alertness level of the training subject is in a first range.

7 Claims, 13 Drawing Sheets

(56) References Cited

U.S. PATENT DOCUMENTS

| | | | |
|---|---|---|---|
| 2020/0057487 A1* | 2/2020 | Sicconi | G06F 3/011 |
| 2020/0379460 A1* | 12/2020 | Stent | G06V 10/82 |
| 2021/0357670 A1* | 11/2021 | Wu | G06T 7/70 |

* cited by examiner

FIG. 2
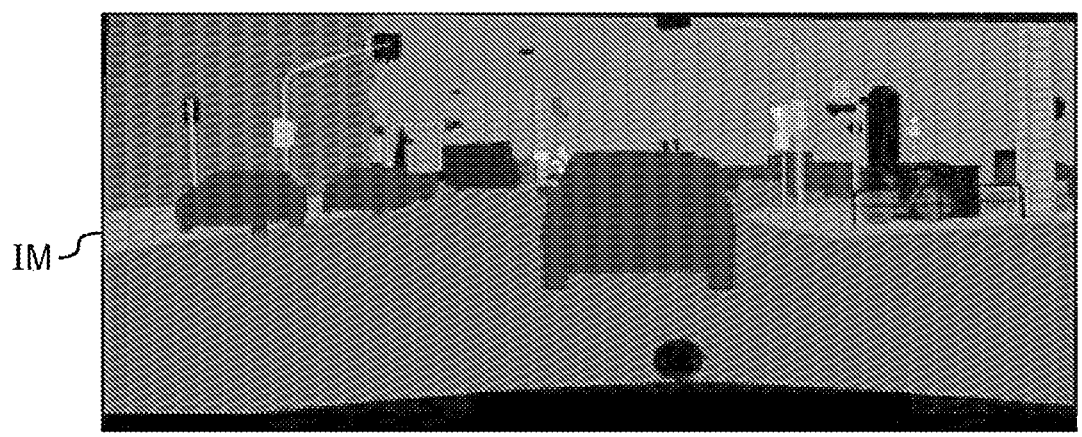
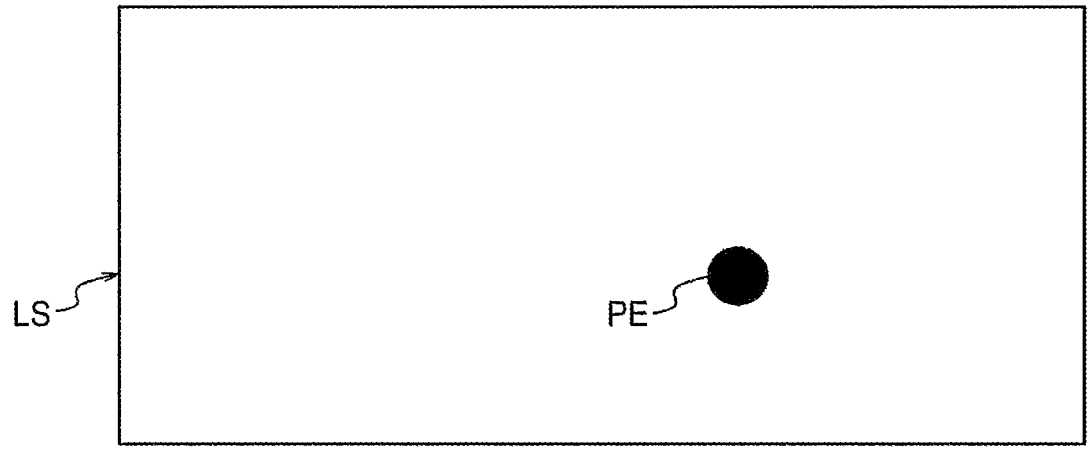

FIG. 3
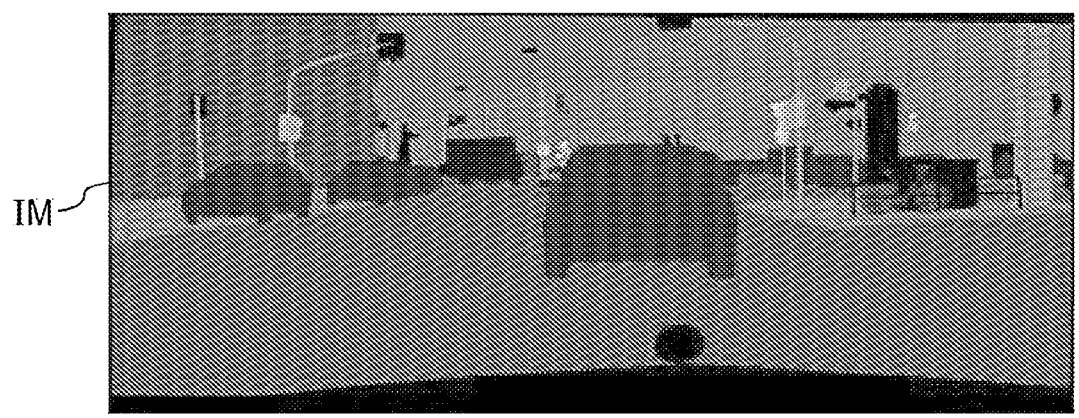
IM
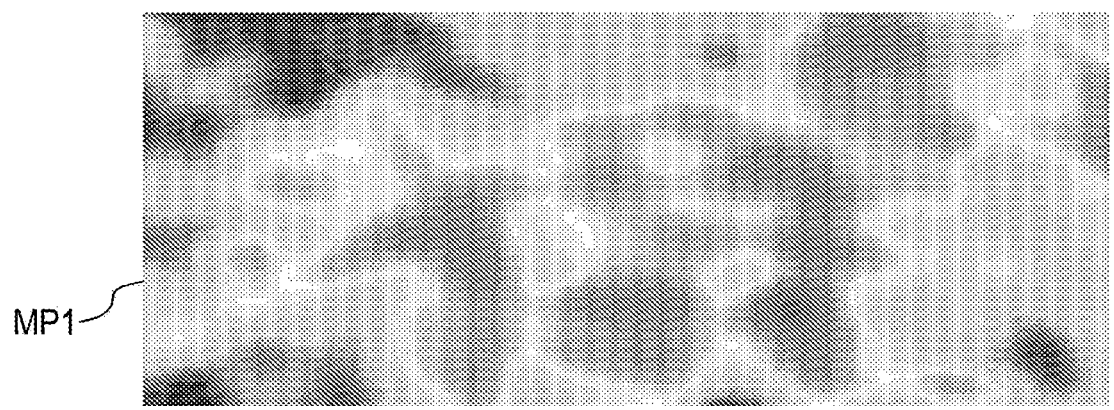
MP1

FIG. 8

| PROBABILITY OF LINE OF SIGHT [%] | WEIGHTING |
|---|---|
| 100 – 80 | 1.5 |
| 79 – 60 | 1.0 |
| 59 – 40 | 0.5 |
| ⋮ | ⋮ |

ELECTRONIC DEVICE, INFORMATION PROCESSING DEVICE, ALERTNESS LEVEL CALCULATING METHOD, AND ALERTNESS LEVEL CALCULATING PROGRAM

CROSS-REFERENCE TO RELATED APPLICATIONS

This application claims priority of Japanese Patent Application No. 2020-123234 filed in Japan on Jul. 17, 2020 and the entire disclosure of this application is hereby incorporated by reference.

TECHNICAL FIELD

The present disclosure relates to an electronic device, an information processing device, an alertness level calculating method, and an alertness level calculating method program.

BACKGROUND OF INVENTION

The attention of a driver is required for safe operation of a mobile object. Therefore, studies have been conducted on observing the driver's attention and issuing warnings to the driver or providing driving assistance when the driver's attention falls. As a way of observing attention, a method has been proposed in which cumulative visibility, which is a cumulative value of the degree of overlap of the line of sight with an object such as an oncoming vehicle around the driver's own vehicle, is calculated and compared with a reference value (refer to Patent Literature 1). An attention estimating system has also been proposed. The attention estimating system estimates whether or not a person being monitored visually recognizes an object to be viewed (refer to Patent Literature 2).

CITATION LIST

Patent Literature

Patent Literature 1: International Publication No. 2008-029802
Patent Literature 2: Japanese Unexamined Patent Application Publication No. 2015-207163

SUMMARY

In order to solve the above-described problem, in a First Aspect, an electronic device includes an image-capturing unit, a line-of-sight detector, and a controller.

The image-capturing unit is configured to generate an image corresponding to a view by performing image capturing.

The line-of-sight detector is configured to detect a line of sight of a subject with respect to the view.

The controller is configured to estimate an alertness level of the subject based on the image and the line of sight.

The controller functions as a first estimator constructed based on learning data obtained by machine learning a relationship between a learning image and a line of sight of a training subject with respect to the learning image when an alertness level of the training subject is in a first range and capable of estimating, based on the image, a first heat map representing a probability of the line of sight being at each position in the image when the alertness level is in the first range.

The controller calculates the alertness level of the subject based on the first heat map and the line of sight of the subject.

In a Second Aspect, an information processing device includes an acquiring unit, a controller, and an output unit.

The acquiring unit is configured to acquire an image corresponding to a view and a line of sight of a subject with respect to the view.

The controller is configured to estimate an alertness level of the subject based on the image and the line of sight.

The output unit is configured to output the alertness level.

The controller functions as a first estimator constructed based on learning data obtained by machine learning a relationship between a learning image and a line of sight of a training subject with respect to the learning image when an alertness level of the training subject is in a first range and capable of estimating, based on the image, a first heat map representing a probability of the line of sight being at each position in the image when the alertness level is in the first range.

The controller calculates the alertness level of the subject based on the first heat map and the line of sight of the subject.

In a Third Aspect, an alertness level calculating method includes generating an image corresponding to a view by performing image capturing, detecting a line of sight of a subject with respect to the view, and estimating an alertness level of the subject based on the image and the line of sight.

The estimating, using learning data obtained by machine learning a relationship between a learning image and a line of sight of a training subject with respect to the learning image when an alertness level of the training subject is in a first range, estimates, based on the image, a first heat map representing a probability of the line of sight being at each position in the image when the alertness level is in the first range, and calculates the alertness level of the subject based on the first heat map and the line of sight of the subject.

In a Fourth Aspect, an alertness level calculating program is configured to cause a computer to function as an image-capturing unit, a line-of-sight detector, and a controller.

The image-capturing unit is configured to generate an image corresponding to a view by performing image capturing.

The line-of-sight detector is configured to detect a line of sight of a subject with respect to the view.

The controller is configured to estimate an alertness level of the subject based on the image and the line of sight.

The controller functions as a first estimator constructed based on learning data obtained by machine learning a relationship between a learning image and a line of sight of a training subject with respect to the learning image when an alertness level of the training subject is in a first range and capable of estimating, based on the image, a first heat map representing a probability of the line of sight being at each position in the image when the alertness level is in the first range.

The controller calculates the alertness level of the subject based on the first heat map and the line of sight of the subject.

BRIEF DESCRIPTION OF THE DRAWINGS

FIG. 2 is a diagram for describing the relationship between a line of sight detected by a line-of-sight detector and an image.

FIG. 3 is a diagram illustrating a specific example of a first heat map estimated by a first estimator for an image.

FIG. 8 is a table in which weights determined for line of sight probabilities are associated with the line of sight probabilities.

DESCRIPTION OF EMBODIMENTS

Figure 1:
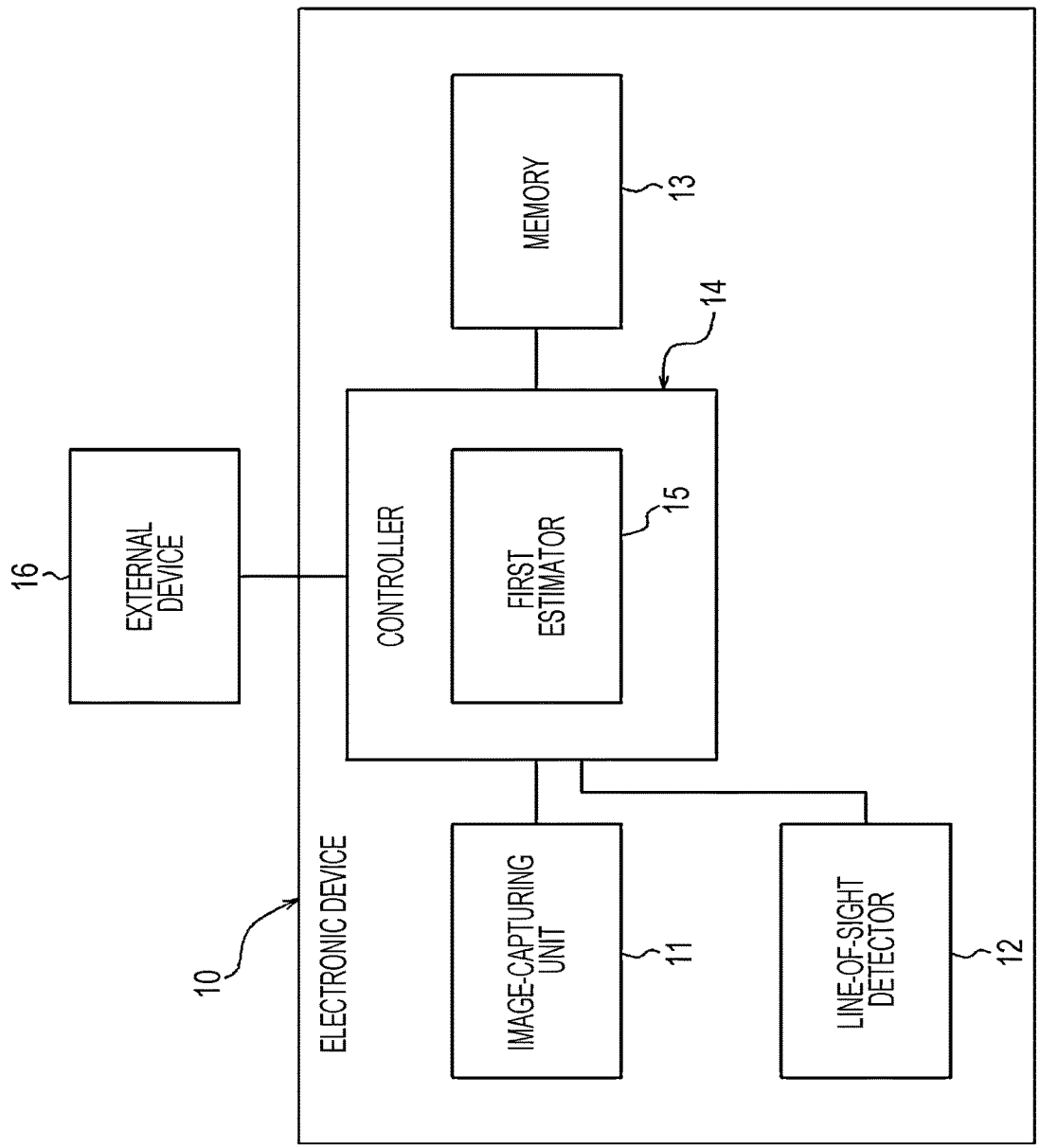
FIG. 1 is a block diagram illustrating the outline configuration of an electronic device according to a First Embodiment.

Hereafter, electronic devices to which embodiments of the present disclosure have been applied will be described while referring to the drawings. The following description also serves as a description of an information processing device, an alertness level calculating method, and an alertness level calculating program to which the present disclosure has been applied.

An electronic device according to a First Embodiment of the present disclosure is provided in a mobile object, for example. Such mobile objects may include, for example, vehicles, ships, and aircraft. Vehicles may include, for example, automobiles, industrial vehicles, rail vehicles, motorhomes, and fixed-wing aircraft that taxi along runways. Automobiles may include, for example, passenger cars, trucks, buses, motorcycles, and trolleybuses. Industrial vehicles may include, for example, industrial vehicles used in agriculture and construction. Industrial vehicles may include, for example, forklift trucks and golf carts. Industrial vehicles used in agriculture may include, for example, tractors, cultivators, transplanters, binders, combine harvesters, and lawn mowers. Industrial vehicles used in construction may include, for example, bulldozers, scrapers, excavators, crane trucks, dump trucks, and road rollers. Vehicles may include vehicles that are human powered. The categories of vehicles are not limited to the above examples. For example, automobiles may include industrial vehicles that can travel along roads. The same vehicles may be included in multiple categories. Ships may include, for example, jet skis, boats, and tankers. Aircraft may include, for example, fixed-wing and rotary-wing aircraft.

As illustrated in FIG. 1, an electronic device 10 according to the First Embodiment of the present disclosure includes an image-capturing unit 11, a line-of-sight detector 12, a memory 13, and a controller 14.

The image-capturing unit 11 is, for example, provided in a mobile object so as to be capable of capturing images of the view in the direction of movement of the mobile object. The image-capturing unit 11 is, for example, a camera capable of capturing images at a rate of 30 fps. The image-capturing unit 11 generates an image corresponding to the view by performing image capturing.

The line-of-sight detector 12 is, for example, provided in the mobile object so as to capable of detecting the line of sight a subject sitting in the driver's seat of the mobile object. The line-of-sight detector 12 is, for example, either a contact-type eye tracker or a non-contact type eye tracker, and detects the line of sight of the subject with respect to the view. As illustrated in FIG. 2, a line of sight LS is, for example, illustrated as the direction of a line of sight corresponding to a position PE in the same coordinate system as an image IM generated by image capturing performed by the image-capturing unit 11.

The line-of-sight detector 12 may detect line-of-sight data by detecting a time series of the line of sight as line-of-sight data. More specifically, the line-of-sight detector 12 may detect the position of the line of sight on the image every time interval and output a time series of the positions of the line of sight as the line-of-sight data. The line-of-sight detector 12 may detect the line of sight at a higher rate, i.e., at a higher frequency than the image-capturing unit 11, and may accumulate a time series of the detected positions of the line of sight, and output the accumulated positions as a path of the line of sight in an image.

The memory 13 includes any suitable storage device such as a random access memory (RAM) or a read only memory (ROM). The memory 13 stores various programs that allow the controller 14 to function and a variety of information used by the controller 14.

The controller 14 includes one or more processors and memories. Such processors may include general-purpose processors into which specific programs are loaded to perform specific functions, and dedicated processors dedicated to specific processing. Dedicated processors may include an application specific integrated circuit (ASIC). Processors may include programmable logic devices (PLDs). PLDs may include field-programmable gate arrays (FPGAs). The controller 14 may be either a system-on-a-chip (SoC) or a system in a package (SiP), in which one or more processors work together. The controller 14 controls operation of each component of the electronic device 10.

In normal operation, the controller 14 causes the image-capturing unit 11 to perform continuous image capturing at a rate of, for example, 30 fps and continuously acquires images IM as information. The controller 14 causes the line-of-sight detector 12 to detect the line of sight LS of the subject while the image-capturing unit 11 is performing image capturing and acquires the line of sight LS in a time period substantially coinciding with the time point of capture of the image IM. The meaning of "a time period substantially coinciding with a time point of capture of the image IM" may include a single time point of detection or may include multiple time points of detection during the period from a time point of the image capture immediately preceding capture of the most recent image IM to a time point of the most recent capture of an image IM. In the case of a single time point of detection of the line of sight, the time period substantially coinciding with a time point of capture of an image IM does not need to include the exact time point, and the time period may include the time point closest to the time point of capture of an image IM in line of sight detection performed in the same period as the image capturing. The controller 14 associates the image IM and the line of sight LS detected in a period substantially coinciding with the time point of capture of the image IM and stores the associated image IM and line of sight LS in the memory 13.

The controller 14 may perform image processing on the acquired image IM. As described later, in a configuration where training of the estimator is performed using images obtained by performing prescribed image processing on normal captured images IM such as semantic segmentation images or the like, the controller 14 performs the prescribed image processing on an acquired image IM and stores the image IM in association with the line of sight LS in the memory 13. A semantic segmentation image is an image in which a label or a category has been assigned to all pixels within the image.

The controller 14 estimates the alertness level of the subject based on an image IM and a line of sight LS, the line of sight LS being detected during a time period that substantially coincides with the time point of capture of the image IM. More specifically, the controller 14 estimates the alertness level of the subject by functioning as a first estimator 15.

The first estimator 15 estimates a first heat map when the alertness level of the subject is in a first range based on the image IM. As illustrated in FIG. 3, a first heat map MP1 is a two-dimensional map representing the probability of each position being looked at by a general subject, i.e., overlapping with the line of sight LS, for a specific view when the alertness level of the general subject is within the first range at each position in the image IM corresponding to that view. The first range is a range within which the subject can be determined as being in an inattentive state. For example, if a range from 0% to not more than 33% is considered a low alertness level, a range greater than 33% and not more than 66% is considered a normal alertness level, and a range greater than 66% and not more than 100% is considered a high alertness level, the first range is, for example, any range defined within a range not less than 0% and not more than 33%. The first range is not limited to this range and may be set as appropriate.

The first estimator 15 consists of, for example, a multilayer neural network. As described later, the first estimator 15 is constructed by performing machine learning. The first estimator 15 described below in the present disclosure may consist of a multilayer neural network.

As described below, in a configuration where the first estimator 15 is constructed by training using multiple continuously captured learning images, the controller 14 may estimate a single first heat map MP1 based on the multiple continuously captured images IM and the line of sight LS for each of the multiple images IM, in other words, the lines of sight LS associated with the multiple images IM. The controller 14, for example, may estimate a single first heat map MP1 based on images IM of frames within a prescribed time interval backwards from the most recent image IM.

The controller 14 calculates the alertness level of the subject based on the first heat map MP1 estimated by the first estimator 15 and the line of sight LS. The controller 14, for example, identifies a position within the first heat map MP1 corresponding to the line of sight LS of the subject or an area including that position. The controller 14 also calculates the alertness level according to the probability at the position in the first heat map MP1, or the average or weighted average of the probabilities in an area including the position. The controller 14 calculates the alertness level, for example, using a function or table, so that the greater the probability, the lower the alertness level. For example, the controller 14 may calculate the alertness level so that the greater the probability, the closer the alertness level of the subject is to a specific value such as the average, maximum, or minimum value within the first range. The controller 14 may calculate the alertness level using an integrated value of probabilities along the path of the line of sight LS of the subject on the single first heat map MP1 estimated by the first estimator 15, for example.

The controller 14 may calculate the alertness level of the subject based on multiple first heat maps MP1 each estimated based on multiple continuously captured images IM and integrated values of probabilities corresponding to positions of the line of sight LS, in the multiple first heat maps MP1, for the multiple images IM. The controller 14 may, for example, calculate the alertness level based on first heat maps MP1 each corresponding to images IM of frames within a predetermined time interval back from the most recent image IM.

As described below, in a configuration where the first estimator 15 is constructed based on learning using learning images for which the movement speed of the line of sight LS is less than a threshold with respect to multiple continuously captured learning images, the controller 14 may estimate an overall alertness level of the subject by excluding combinations of lines of sight LS and images IM associated with the lines of sight LS for which the movement speed of the line of sight LS is greater than or equal to a threshold, from among multiple continuously captured images IM and the line of sights LS for the multiple images IM. More specifically, when the amount of movement of a line of sight LS at a particular detection time from the line of sight LS at the immediately previous detection time exceeds a threshold, the controller 14 may exclude the combination of the line of sight LS at the particular detection time and the image IM associated with the detection time of that line of sight LS. In other words, the controller 14 may exclude information during a saccade. The reason for excluding such information is that a saccade is an action that takes place during the process of moving to the next gazing point, and the position of the line of sight during the saccade has no meaning as a point being looked at. The controller 14 may determine whether or not a saccade is occurring based on the speed of movement between positions of line of sight.

For example, in a configuration where a single first heat map MP1 is estimated based on a line of sight LS associated with each of multiple images IM, the single first heat map MP1 may be estimated by excluding the above-described combinations and the alertness level may be calculated based on the first heat map MP1 and the line of sight LS. On the other hand, in a configuration where the alertness level of the subject is calculated based on an integrated value of probabilities, in multiple first heat maps MP1, respectively corresponding to the positions of the line of sight LS in multiple images IM, multiple first heat maps MP1, from which the above combinations have been excluded, may be estimated and the alertness level may be calculated based on the integrated value of probabilities corresponding to line of sight LS excluding the above combinations.

In a configuration in which the first estimator 15 is constructed by learning using a path that includes a portion for which the movement speed of a line of sight LS is less than a threshold within a single learning image, the controller 14 may estimate the overall alertness level of the subject by excluding the portion for which the movement speed of the line of sight LS is greater than or equal to the threshold out of the path of the line of sight LS.

The controller 14 outputs the calculated alertness level to an external device 16. The external device 16 is a device that performs a prescribed operation based on the alertness level. The external device 16 is, for example, a warning device that alerts the subject based on the alertness level, a driving assistance device that assists the subject in driving the mobile object based on the alertness level, or a driving device that operates the mobile object based on the alertness level.

The first estimator 15 is constructed based on learning data obtained by machine learning the relationship between a learning image and the actual line of sight of a training subject when the subject's alertness level with respect to the learning image is in the first range. The alertness level of the training subject used in the learning is calculated from biometric information about the alertness level detected from the training subject. The biometric information about the alertness level is biometric information that allows the alertness level to be calculated or estimated. Information that allows the alertness level to be calculated or estimated includes, for example, at least one out of heart rate, EEG, blink frequency, percentage of eyelid closure (PERCLOS), and so on.

The first estimator 15 estimates the probability of overlap with the line of sight LS for each pixel or each region composed of multiple pixels constituting an image IM based on the relationship between the learning image and the line of sight LS of the training subject when the alertness level is within the first range. The first estimator 15 generates the first heat map MP1. The first heat map MP1 represents in a two-dimensional manner the corresponding probability for each position in an image IM when the alertness level is within the first range.

The first estimator 15 may be further constructed by machine learning the actual line of sight of the training subject with respect to multiple consecutively captured learning images and the views corresponding to the multiple learning images, when the alertness level is within the first range. More specifically, the probability of overlap with the line of sight LS may be estimated for each pixel or each region composed of multiple pixels constituting a single image IM based on the position of the line of sight of the training subject whose alertness level is in the first range for each of the multiple continuously captured learning images. The first estimator 15 may be further constructed based on learning images and lines of sight where the speed of movement of the line of sight with respect to multiple continuously taken learning images is less than a threshold.

Figure 4:
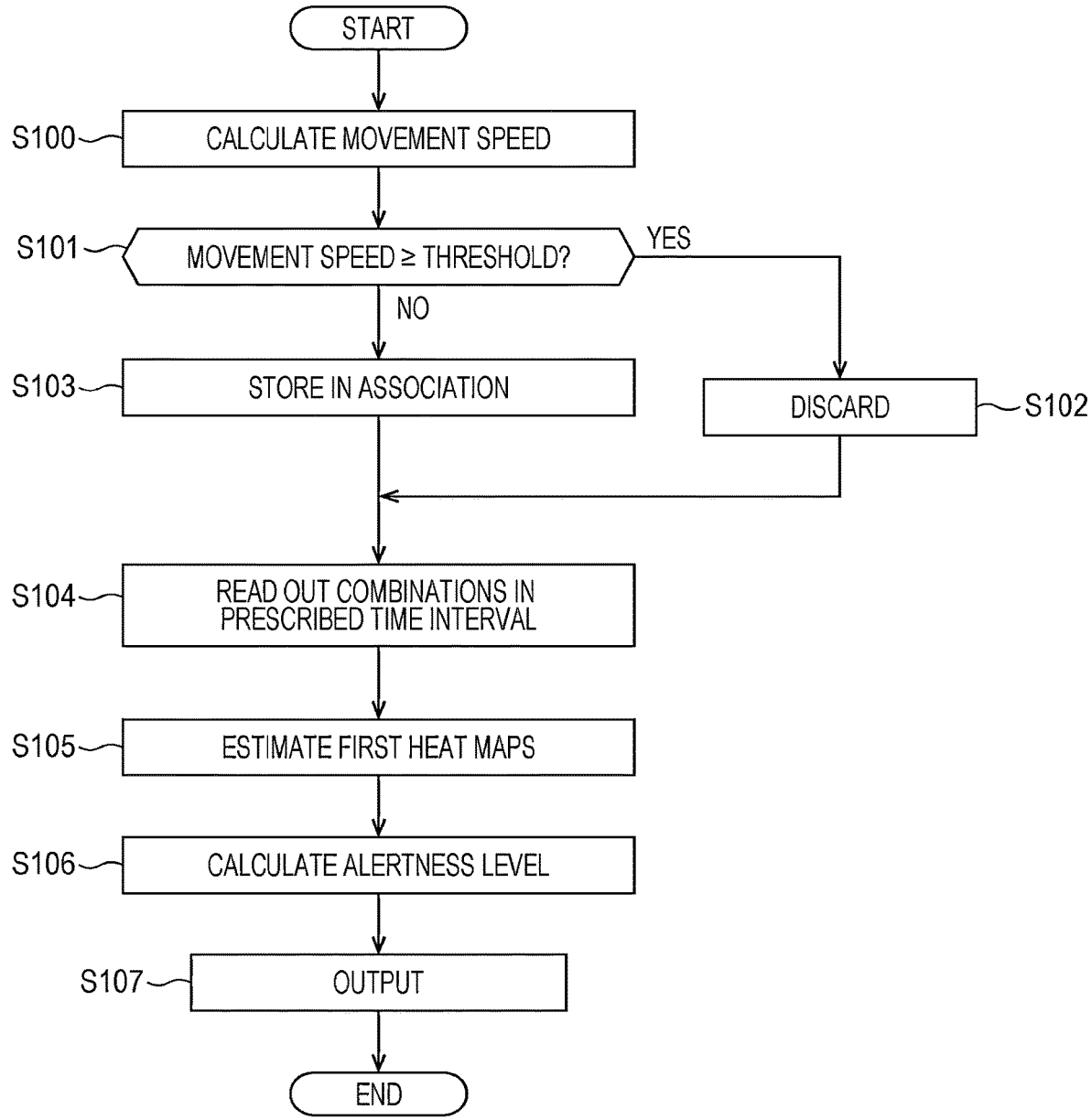
FIG. 4 is a flowchart for describing estimation processing performed by a controller in FIG. 1 in the First Embodiment.

Next, estimation processing executed by the controller 14 in the First Embodiment will be described using the flowchart in FIG. 4. The estimation processing starts whenever the controller 14 acquires an image IM of one frame and a line of sight LS.

In Step S100, the controller 14 calculates the movement speed of the acquired line of sight LS based on a comparison of the acquired line of sight LS and a position PE of the line of sight LS acquired immediately previously. After the calculation, the process advances to Step S101.

In Step S101, the controller 14 determines whether the movement speed calculated in Step S101 is greater than or equal to a threshold. When the movement speed is greater than or equal to the threshold, the process advances to Step S102. When the movement speed is not greater than or equal to the threshold, the process advances to Step S103.

In Step S102, the controller 14 discards the image IM and the line of sight LS acquired at the start of the estimation processing. After the discarding, the process advances to Step S104.

In Step S103, the controller 14 stores the image IM and the line of sight LS acquired at the start of the estimation processing in the memory 13 in associated with each other. After storing the data, the process advances to Step S104.

In Step S104, the controller 14 reads, from the memory 13, images IM in combinations of an image IM and a line of sight LS stored within a prescribed time interval backward. After that, the process advances to Step S105.

In Step S105, the controller 14 estimates first heat maps MP1 by functioning as the first estimator 15 based on multiple images IM included in the combinations read out in Step S104. After the estimation, the process advances to Step S106.

In Step S106, the controller 14 determines the probability of the line of sight LS when the alertness level is in the first range based on the multiple first heat maps MP1 estimated in step S105 and the lines of sight LS included in the combinations read out in step S104. The controller 14 calculates the alertness level based on the determined probability. After the calculation, the process advances to Step S107.

In Step S107, the controller 14 outputs the alertness level calculated in Step S106 to the external device 16. After the output, the estimation processing ends.

In the thus-configured electronic device 10 of the First Embodiment, the controller 14 functions as the first estimator 15 capable of estimating, based on an image IM, a first heat map MP1 representing the probability of the line of sight LS being at each position in the image IM when the alertness level is in the first range, and the controller 14 estimates the alertness level of the subject based on the estimated first heat map MP1 and the line of sight LS. For example, it is common for the object being looked at and the direction of looking to change for a variety of views, such as highways, urban areas, suburban areas, and residential areas. Therefore, it is difficult to improve the accuracy with which the alertness level is estimated by simply detecting only the movement of the line of sight LS. However, with the above-described configuration, since the electronic device 10 has already learned what objects people tend to look at when their alertness level is low for a variety of views, the electronic device 10 can estimate the level of alertness with high accuracy based on an image IM and a line of sight LS corresponding to the view on that occasion. Since human attention is affected by the alertness level, the electronic device 10 can improve the accuracy with which the subject's attention is estimated in many different situations.

The electronic device 10 of the First Embodiment calculates the alertness level of the subject based on multiple continuously captured images IM and the lines of sight LS for the multiple images IM. With this configuration, since the electronic device 10 has already learned how the line of sight LS varies in various views depending on different alertness levels, the electronic device 10 can calculate the alertness level with even higher accuracy based on an image IM and a line of sight LS corresponding to the view on that occasion.

The electronic device 10 of the First Embodiment calculates the alertness level of the subject by excluding combinations of lines of sight LS and images IM, among the multiple continuously captured images IM and the line of sight LS for the multiple images IM, for which the speed of movement of the line of sight LS exceeds a threshold. The object that the subject is gazing at in the view is expected to be a factor that significantly affects the alertness level. Therefore, it is expected that the line of sight LS will have little effect on the alertness level during a rapid change in line of sight from one object to another object, such as during a saccade. Therefore, since the electronic device 10 having the configuration described above excludes combinations of images IM and lines of sight LS that are considered to have little effect on the alertness level, the electronic device 10 can calculate the alertness level with even greater accuracy.

Next, an electronic device 10 according to a Second Embodiment of the present disclosure will be described. In the Second Embodiment, some of the functions of the controller 14 are different from in the First Embodiment. Hereafter, the Second Embodiment will be described focusing on points that are different from in the First Embodiment. Parts having the same configuration as in the First Embodiment are denoted by the same reference symbols.

Figure 5:
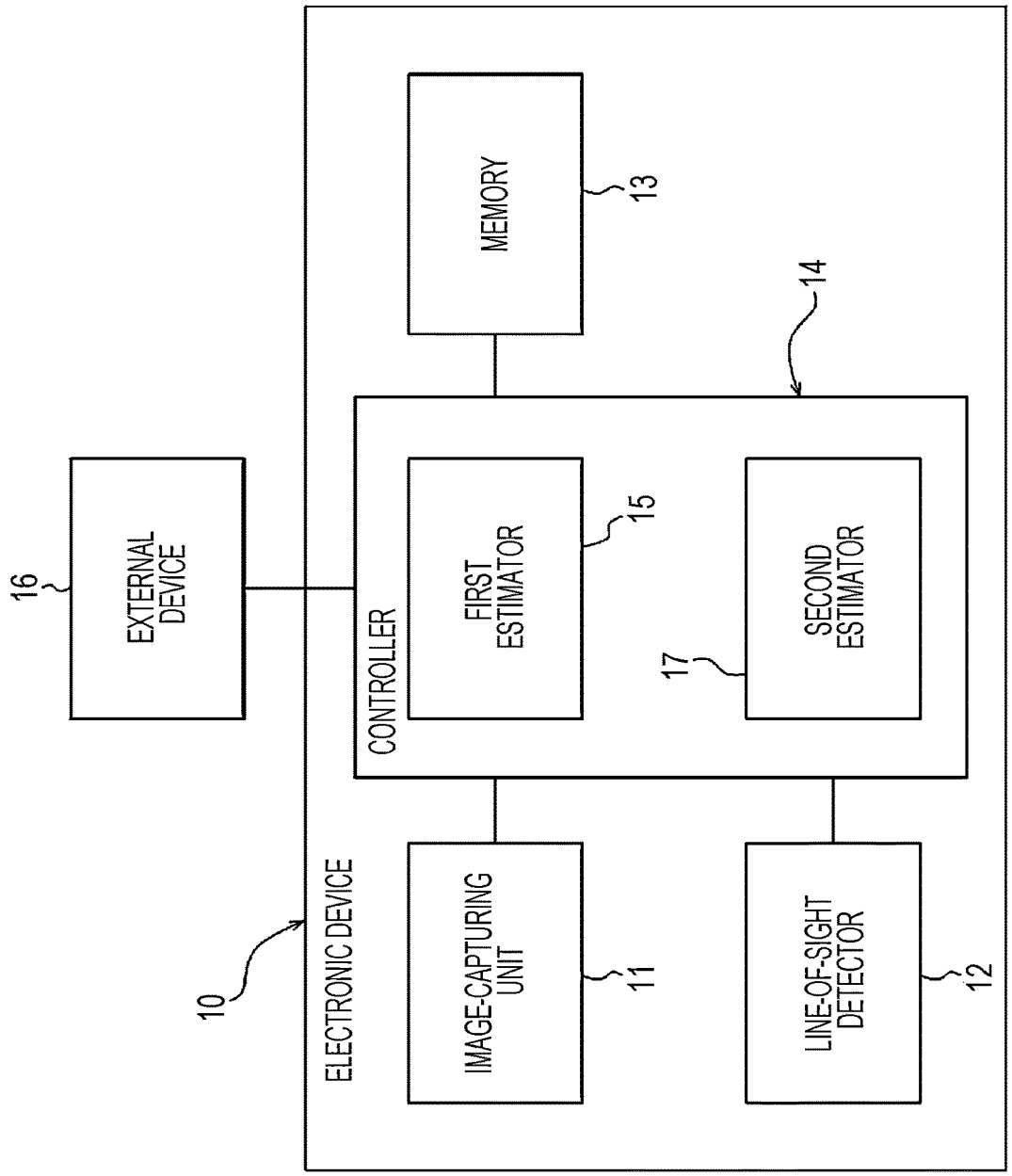
FIG. 5 is a block diagram illustrating the outline configuration of an electronic device according to a Second Embodiment.

As illustrated in FIG. 5, the electronic device 10 according to the Second Embodiment includes an image-capturing unit 11, a line-of-sight detector 12, a memory 13, and a controller 14. The configurations and functions of the image-capturing unit 11, the line-of-sight detector 12, and the memory 13 in the Second Embodiment are the same as in the First Embodiment. The configuration of the controller 14 in the Second Embodiment is the same as in the First Embodiment.

In the Second Embodiment, unlike in the First Embodiment, the controller 14 estimates the alertness level of the subject based on an image IM and a line of sight LS, for which the image capture time and the detection time substantially coincide with each other, by functioning as a first estimator 15 and a second estimator 17. In the Second Embodiment, the function and learning method of the first estimator 15 are the same as in the First Embodiment.

The second estimator 17 estimates a second heat map when the alertness level of the subject is in a second range based on the image IM. Similarly to the first heat map MP1, the second heat map is a two-dimensional map representing the probability of each position being looked at by a general subject, i.e., overlapping with the line of sight LS, for a specific view when the alertness level of the general subject is in the second range at each position in the image IM corresponding to that view. The second range is a range within which the subject is determined to be in a normal state. For example, if the ranges described above are considered as a low alertness level, a normal alertness level, and a high alertness level, the second range is, for example, any range defined within the range of not less than 33% and not more than 100%. The second range is not limited to this range and may be set as appropriate.

The second estimator 17 consists of, for example, a multilayer neural network. As described later, the second estimator 17 is constructed by performing machine learning.

In the Second Embodiment, unlike in the First Embodiment, the controller 14 calculates the alertness level of the subject based on the first heat map MP1 estimated by the first estimator 15, the second heat map estimated by the second estimator 17, and the line of sight LS of the subject. In the Second Embodiment, the controller 14, for example, calculates the degree of similarity to a first alertness level and a second alertness level based on the line of sight LS of the subject, the first heat map MP1, and the second heat map, and calculates the alertness level based on the calculated degree of similarity. The degree of similarity is a measure of the degree of similarity of the line of sight LS of the subject to that of a typical subject whose alertness level is in the first range, or to the line of sight of a typical subject whose alertness level is in the second range. An example of a method of calculating the degree of similarity will be described below.

The controller 14, for example, calculates the probability of the position of the line of sight LS of the subject in the first heat map MP1 and the second heat map MP2 estimated for a single image IM as the degree of similarity. The controller 14 compares, for example, an integrated value of probabilities along the path of the line of sight LS of the subject on the first heat map MP1 estimated by the first estimator 15 with the integrated value of the probabilities along the path of the line of sight LS of the subject on the second heat map MP2 estimated by the second estimator 17, and the higher integrated value is used to calculate the degree of similarity.

Figure 6:
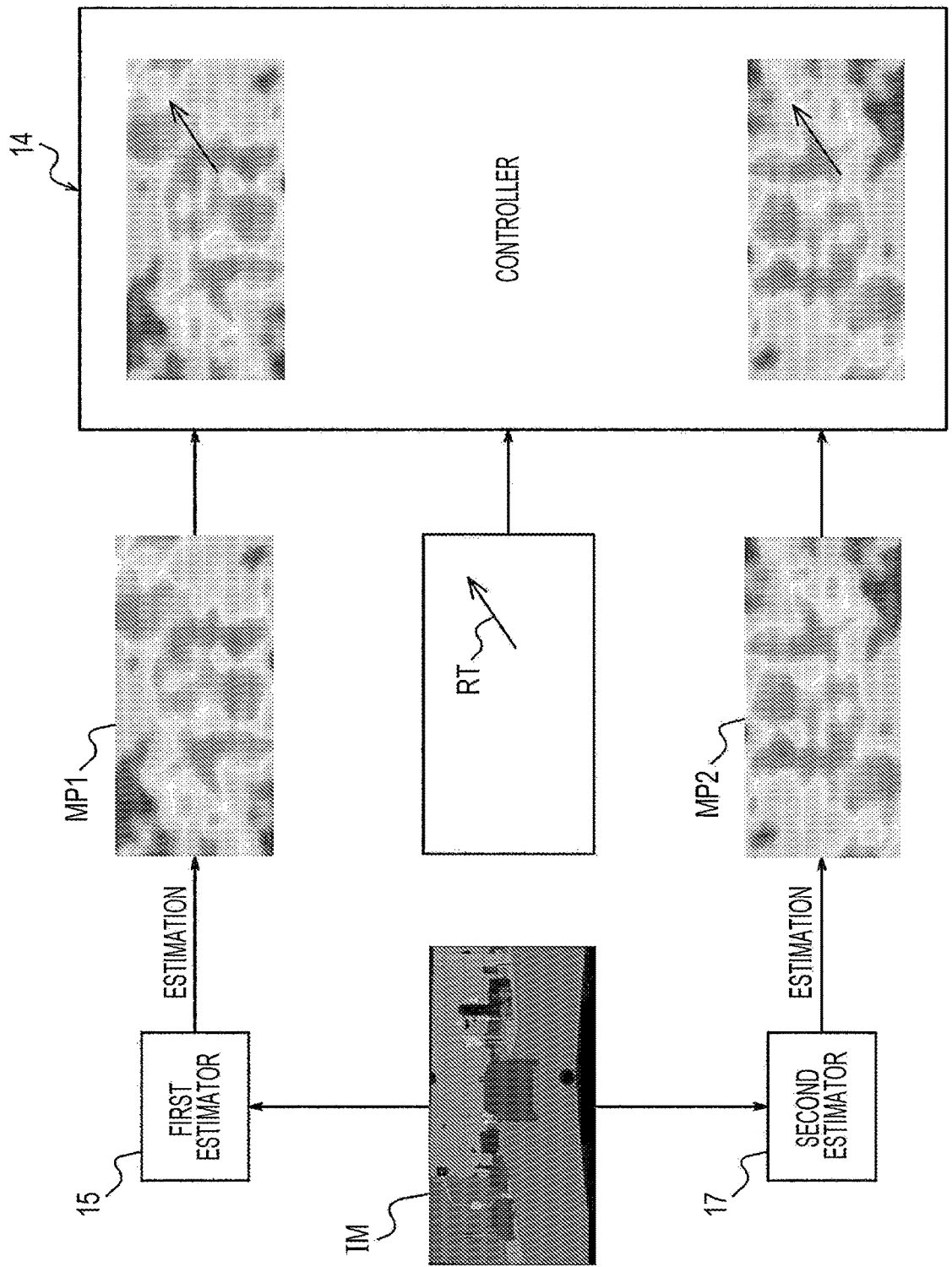
FIG. 6 is a first diagram for describing an algorithm for calculating a degree of similarity executed by a controller in the Second Embodiment.
Figure 7:
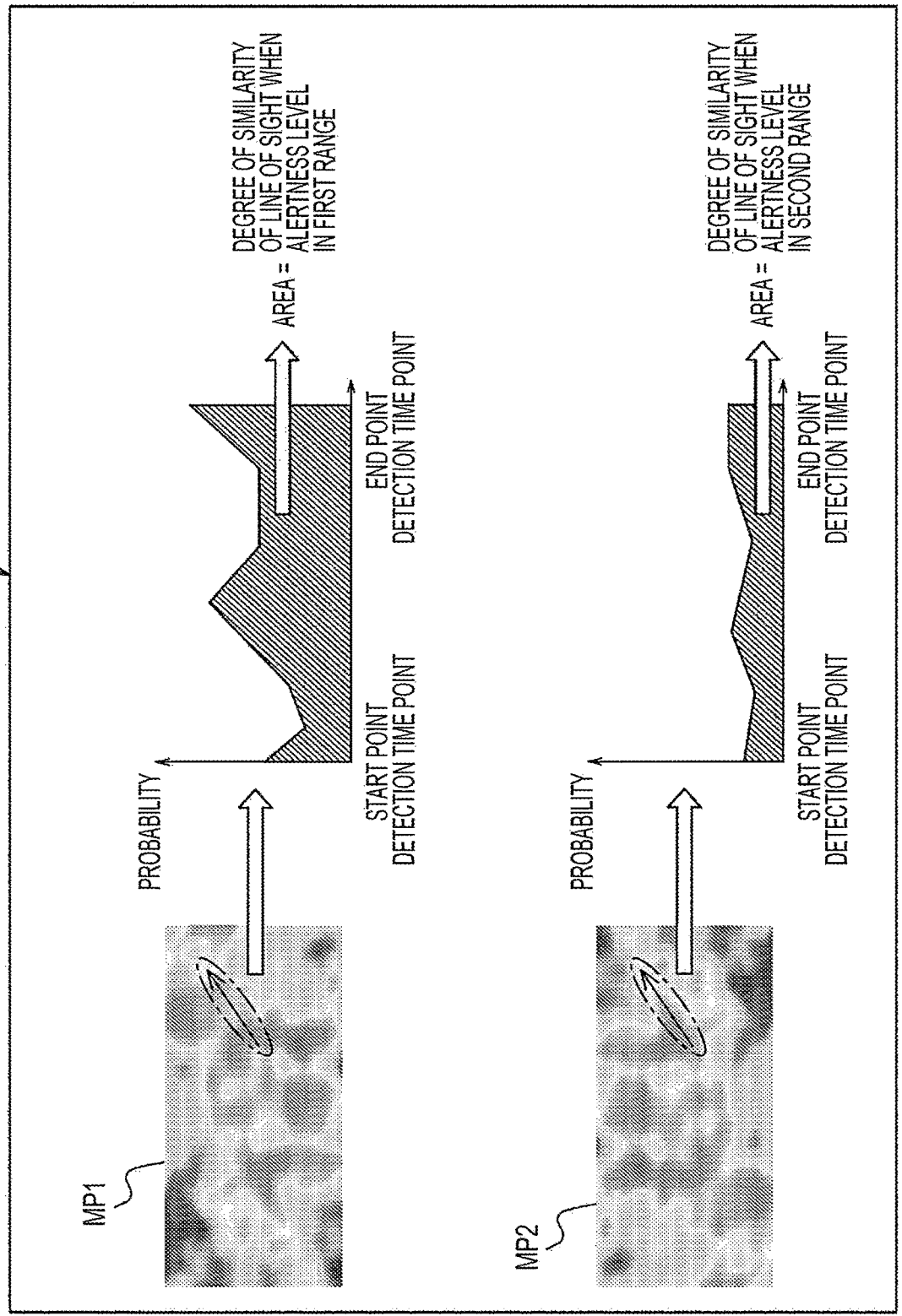
FIG. 7 is a second diagram for describing an algorithm for calculating a degree of similarity executed by a controller in the Second Embodiment.

Calculation of the degree of similarity based on the path of the line of sight LS will be described based on FIGS. 6 and 7. FIGS. 6 and 7 are diagrams for describing an algorithm for calculating a degree of similarity executed by the controller 14 in the Second Embodiment. As described above, the first estimator 15 estimates the first heat map MP1 and the second estimator 17 estimates the second heat map MP2 for a single image IM.

The controller 14 reads out the probability of each position through which the path RT passes in each of the first heat map MP1 and the second heat map MP2 based on the path RT of the line of sight LS for the single image IM. The controller 14 calculates, for example, an integrated value of the probabilities of the positions through which the path RT passes in each of the first heat map MP1 and the second heat map MP2, in other words, the area in the interval between the detection time points of the positions of the line of sight LS at the start point and end point of the path RT, as illustrated in FIG. 7. The controller 14 may calculate this area as the degree of similarity. Alternatively, the controller 14 may calculate a value that increases in accordance with this area as the degree of similarity. For example, the controller 14 may calculate, as the degree of similarity, an integrated value of probabilities weighted so as to increase in accordance with the probability of the line of sight.

As illustrated in FIG. 8, the memory 13 stores a table in which weights are associated with probabilities of the line of sight LS. The controller 14 reads data out from the memory 13 when calculating the weighted integrated value of the probabilities of the line of sight LS.

For example, in the table, the weight is set to 1.5 for probabilities in a range not less than 80% and not more than 100% in a configuration where the probabilities that can be estimated by learning are integers. In the table, the weight is set to 1.0 for probabilities in a range not less than 60% and not more than 79%. In the table, the weight is set to 0.5 for probabilities in a range not less than 40% and not more than 59%. In the table, the weight is set to 0.3 for probabilities in a range not less than 0% and not more than 39%. However, settings other than weights may be set for probabilities.

Thus, the controller 14 can increase the specific weights of the probabilities for which confidence is high by calculating the similarity based on the weighted integrated value of the probabilities of line of sight LS, and as a result, the accuracy with which the alertness level is estimated can be improved. In the First Embodiment described above, the controller 14 may use the table as illustrated in FIG. 8 to increase the specific weights of probabilities for which confidence is high based on the weighted integrated value of the probabilities of the line of sight LS in order to improve the accuracy with which the alertness level is estimated.

The controller 14 may also calculate the average value or weighted average value per unit time and so on of the integrated value of the probabilities described above as the degree of similarity.

The controller 14 may, for example, calculate the alertness level as the average value weighted by similarity to a specific value such as the average, maximum, or minimum value within the first range or the average, maximum, or minimum value within the second range.

In the Second Embodiment, the controller 14 may output the calculated alertness level to the external device 16 as in the First Embodiment.

The second estimator 17 is constructed based on learning data obtained by machine learning the relationship between a learning image and the actual line of sight of the training subject when the subject's alertness level with respect to the learning image is within the second range. The second estimator 17 estimates the probability of overlap with the line of sight LS for each pixel or each region composed of multiple pixels constituting an image IM based on the relationship between the learning image and the line of sight LS of the training subject when the alertness level is in the second range. The second estimator 17 generates the second heat map that represents in a two-dimensional manner the corresponding probability for each position constituting the image IM when the alertness level is in the second range.

Figure 9:
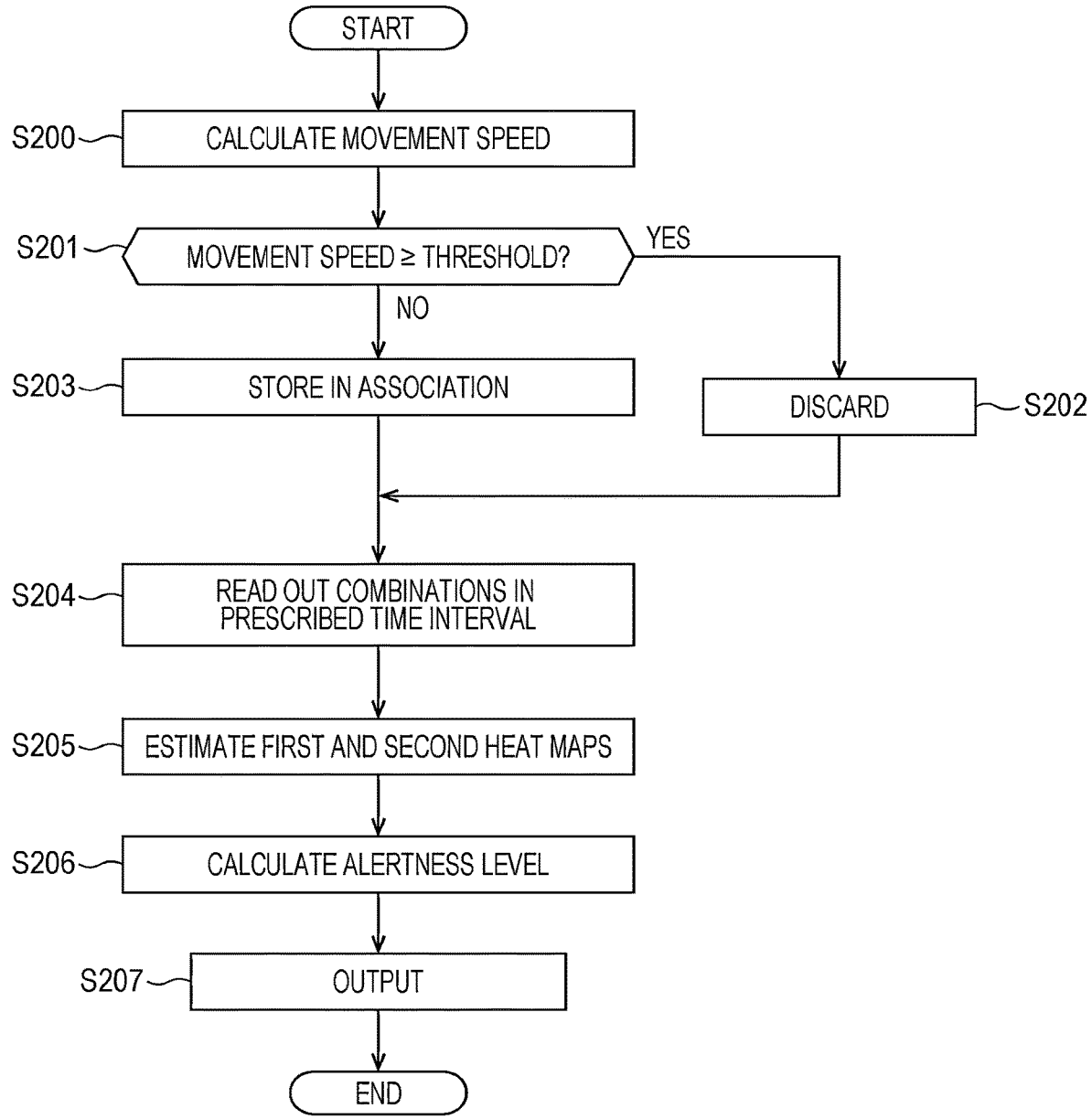
FIG. 9 is a flowchart for describing estimation processing performed by a controller in FIG. 5 in the Second Embodiment.

Next, estimation processing executed by the controller 14 in the Second Embodiment will be described using the flowchart in FIG. 9. The estimation processing starts whenever the controller 14 acquires an image IM of one frame and a line of sight LS.

In Steps S200 to S204, the controller 14 executes the same control as in the estimation processing of the First Embodiment. After reading out the images IM of the combinations in Step S204, the process advances to Step S105.

In Step S205, the controller 14 estimates a first heat map MP1 by functioning as the first estimator 15 based on multiple images IM included in the combinations read out in Step S204. The controller 14 also estimates a second heat map by functioning as the second estimator 17 based on multiple images IM included in the combinations read out in Step S204. After the estimation, the process advances to Step S206.

In Step S206, the controller 14 calculates the alertness level based on multiple first heat maps MP1 and multiple second heat maps estimated in step S205 and the lines of sight LS included in the combinations read out in step S204. After the calculation, the process advances to Step S207.

In Step S207, the controller 14 outputs the alertness level calculated in Step S206 to the external device 16. After the output, the estimation processing ends.

In the thus-configured electronic device 10 of the Second Embodiment, the controller 14 also functions as the second estimator 17 capable of estimating, based on an image IM, a second heat map representing the probability of the line of sight LS being at each position constituting the image IM when the alertness level is in the second range, and the controller 14 estimates the alertness level of the subject based on the estimated first heat map MP1 and second heat map and the line of sight LS. With the configuration described above, the electronic device 10 uses a second heat map in order to estimate the subject's alertness level not only when the alertness level is within the first range, but also when the alertness level is within the second range, and therefore is able to calculate the alertness level with higher confidence, i.e., with higher accuracy.

A variety of variations and amendments may be made to the content of the present disclosure based on the present disclosure by one skilled in the art. Therefore, it should be noted that such variations and amendments are included within the scope of the present disclosure. For example, in each embodiment, each functional part, each means, each step and so on can be added to other embodiments so long as there are no logical inconsistencies, or can be replaced with each functional part, each means, each step, and so on of other embodiments. In each embodiment, a plurality of each functional part, each means, each step, and so on can be combined into a single functional part, means, or step or divided into multiple functional parts, means, or steps. Each of the above-described embodiments of the present disclosure is not limited to faithful implementation of each of the described embodiments, and may be implemented by combining or omitting some of the features as appropriate.

For example, in the First Embodiment, the controller 14 is configured to function as the first estimator 15. However, the controller 14 is not limited to this configuration. For example, the first estimator 15 may estimate heat maps of multiple ranges of alertness level other than the first range.

Figure 10:
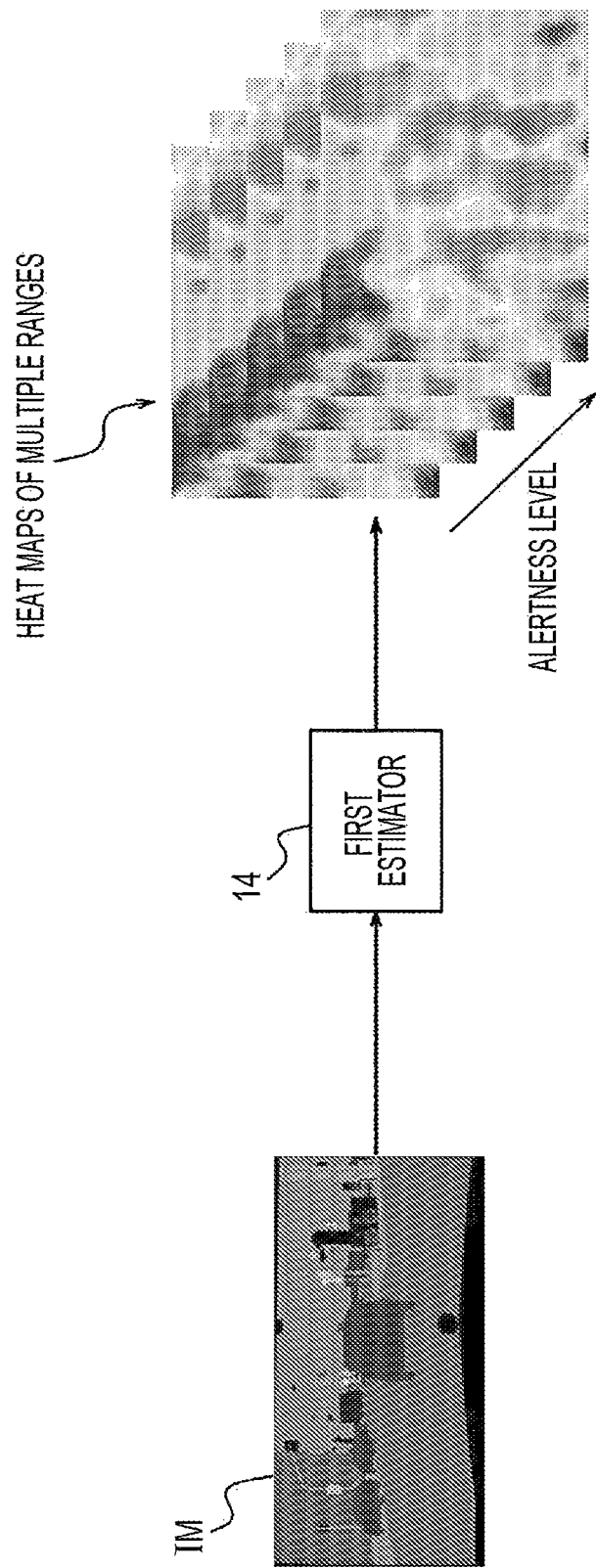
FIG. 10 is a conceptual diagram of a heat map estimated by a first estimator in a variation of the First Embodiment.

A configuration for estimating heat maps of multiple ranges is briefly described below. The controller 14 may output heat maps of multiple ranges for a single image using a three-dimensional array. An electronic device 10 of a variation of the First Embodiment will be described while referring to FIG. 10. FIG. 10 is a conceptual diagram of a heat map estimated in the electronic device 10 according to a variation of the First Embodiment.

Figure 11:
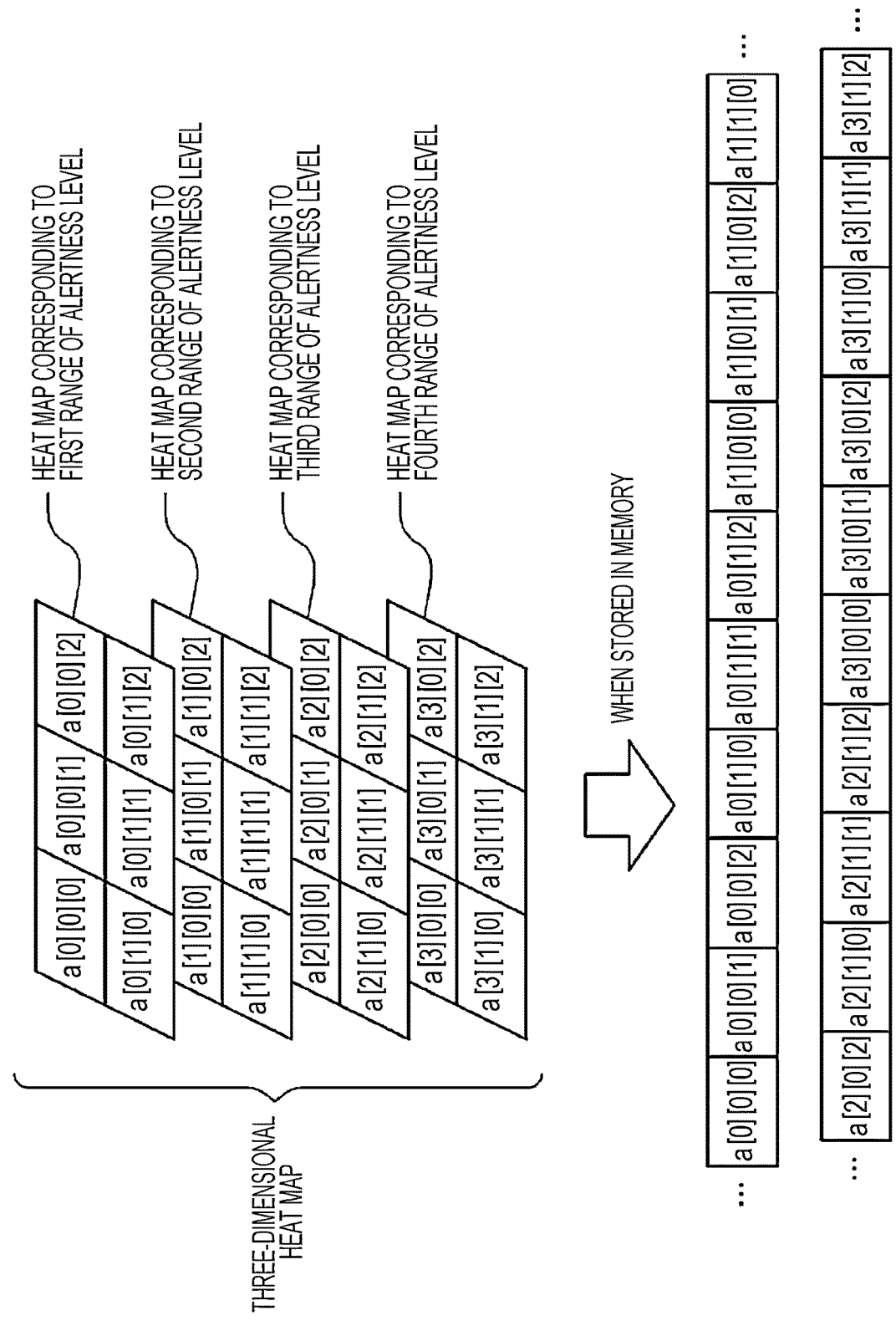
FIG. 11 is a diagram illustrating the data structure of a heat map estimated in a variation of the First Embodiment.

As illustrated in FIG. 10, in the electronic device 10 according to a variation, the first estimator 15 estimates heat maps of multiple ranges. Heat maps of multiple ranges estimated by the first estimator 15 in the electronic device 10 according to a variation will be described while referring to FIG. 11. FIG. 11 is a conceptual diagram of operation of the first estimator 15 in the variation. As illustrated in FIG. 11, the first estimator 15 estimates and outputs a three-dimensional heat map obtained by adding a coordinate axis for multiple alertness level to the image IM, which is illustrated in a vertical pixel x horizontal pixel two-dimensional coordinate system.

For example, the three-dimensional heat map includes a heat map corresponding to a first range of alertness level, a heat map corresponding to a second range of alertness level, a heat map corresponding to a third range of alertness level, and a heat map corresponding to a fourth range of alertness level. The heat map corresponding to the first range of alertness level includes a[0][0][0], a[0][1][0], . . . , a[0][1][2]. Here, a[s][i][j] represents a probability corresponding to the alertness level with s indicating the alertness level number, at the position of the line of sight LS where the x coordinate is i and they coordinate is j. The heat map corresponding to the second range of alertness level includes a[1][0][0], a[1][1][0], . . . , a[1][1][2]. The heat map corresponding to the third range of alertness level includes a[2][0][0], a[2][1][0], a[2][1][2]. The heat map corresponding to the fourth range of alertness level includes a[3][0][0], a[3][1][0], a[3][1][2]. The above three-dimensional heat map is arranged so that the values are continuous and stored sequentially in the memory 13.

The three-dimensional heat map in the above example includes four ranges of alertness level, but the number of ranges of alertness level may be set as appropriate. The three-dimensional heat map is composed of matrix heat maps having a size of 2×3 for each range, but the size may be determined as appropriate.

Figure 12:
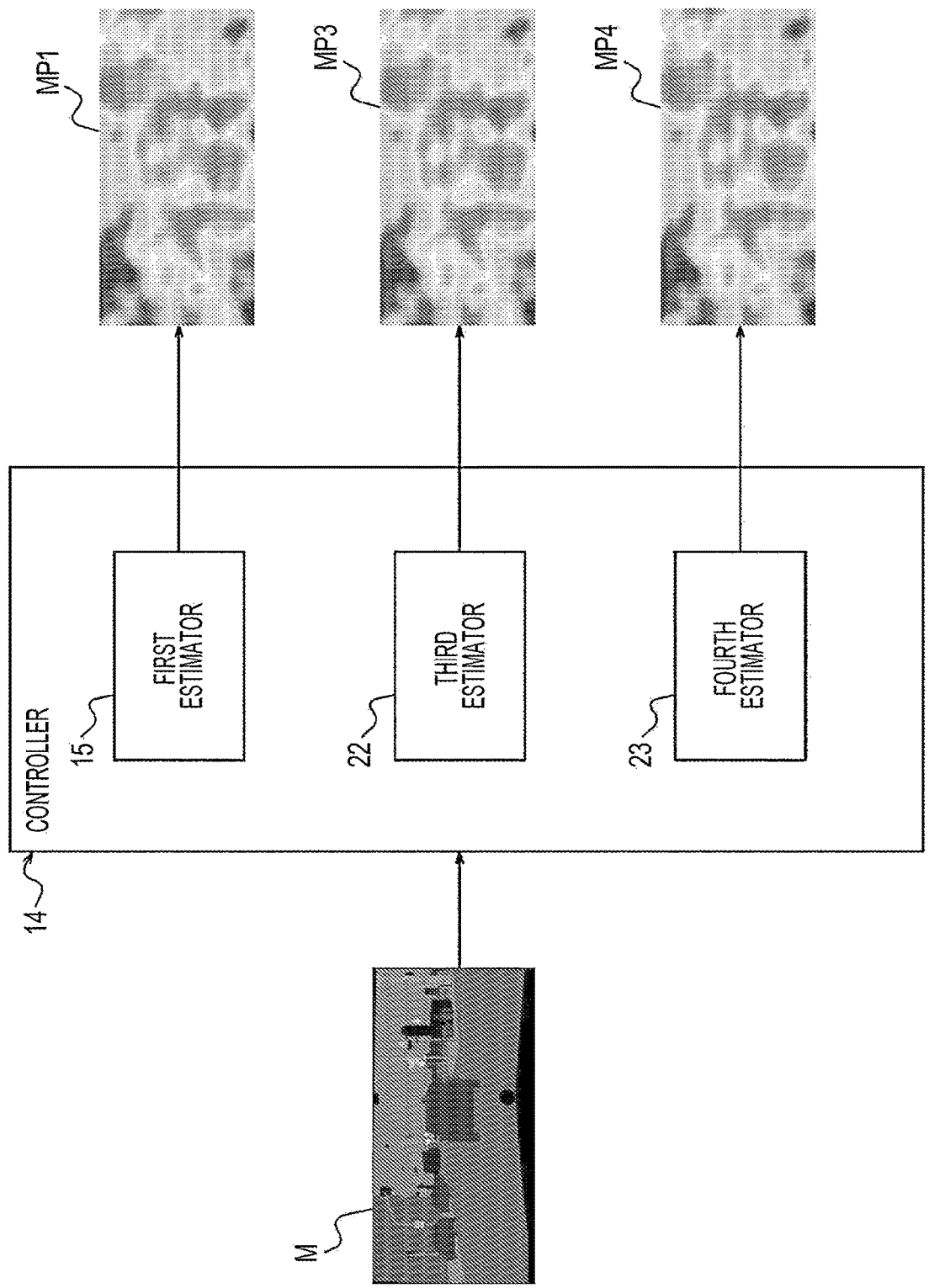
FIG. 12 is a conceptual diagram for describing a configuration in which a controller functions as multiple estimators and estimates heat maps in a variation of the Second Embodiment.

In the Second Embodiment, the controller 14 is configured to function as two estimators, namely, the first estimator 15 and the second estimator 17, but the number of estimators is not limited to two, and the controller 14 may function as multiple estimators. As illustrated in FIG. 12, for example, the controller 14 may function as three estimators, namely, a first estimator 15, a third estimator 22, and a fourth estimator 23. As in the First Embodiment, the first estimator 15 estimates the first heat map MP1 when the alertness level of the subject is in the first range. The third estimator 22 estimates a third heat map MP3 when the alertness level of the subject is in a normal range, for example, a range in which the alertness level is not less than 33% and not more than 66%. The fourth estimator 23 estimates a fourth heat map MP4 when the subject has a high alertness level, for example, when the alertness level is greater than 66% and not more than 100%.

Thus, in a variation of the Second Embodiment, multiple estimators estimate heat maps. In this way, in a variation of the Second Embodiment, the role of each estimator is limited so that each estimator estimates a heat map in accordance with the alertness levels thereof, which enables high performance, such as estimating an appropriate heat map to be realized.

The controller 14 may calculate the alertness level based on the first heat map MP1, a plurality of heat maps, and the line of sight LS of the subject. The plurality of heat maps may be constructed based on learning data obtained by machine learning the relationship between the learning image and the line of sight of the training subject for each of the plurality of ranges of alertness levels of the learning target with respect to the learning image.

Figure 13:
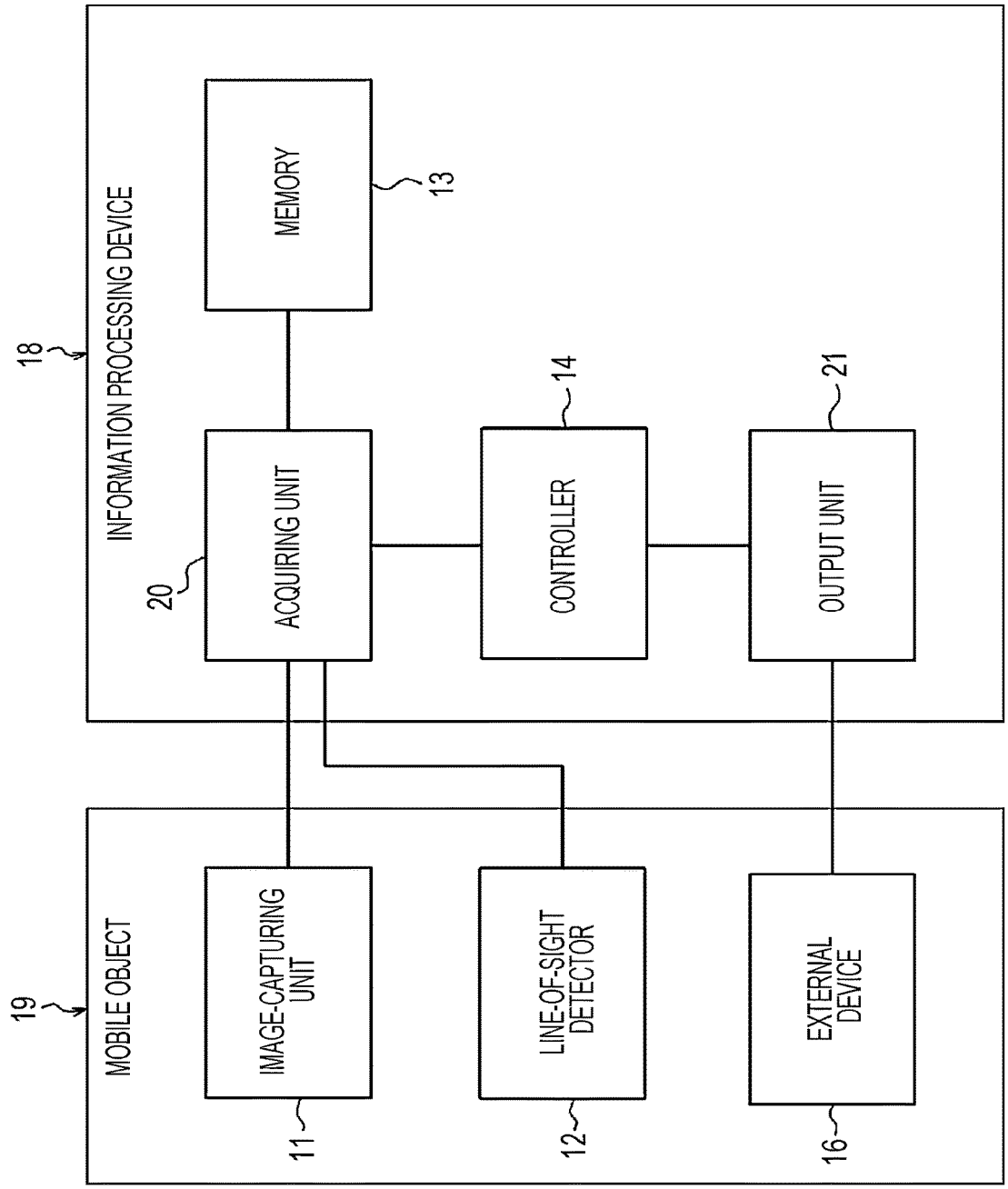
FIG. 13 is a block diagram illustrating an outline configuration of an information processing device, which is a variation of the First Embodiment and the Second Embodiment.

In the First Embodiment and the Second Embodiment, the electronic device 10 includes the image-capturing unit 11 and the line-of-sight detector 12, and the controller 14 acquires the image IM and the line of sight LS to use in estimating the alertness level, but this configuration does not have to be adopted. As illustrated in FIG. 13, for example, an information processing device 18, such as a cloud server, may estimate the alertness level based on the image IM and the line of sight LS, similarly to the electronic device 10. In such a configuration, the information processor 18 may acquire the image IM and the line of sight LS as information from a mobile object 19, in which the image-capturing unit 11 and the line-of-sight detection unit 12 are installed, via an acquiring unit 20. The information processing device 18 may output the estimated alertness level via an output unit 21 to the external device 16 of the mobile object 19.

Many aspects of the content of the present disclosure are presented as a series of operations executed by a computer system or other hardware capable of executing program instructions. Computer systems and other hardware include, for example, general-purpose computers, personal computers (PCs), dedicated computers, workstations, personal communications system (PCS), mobile (cellular) telephones, mobile telephones with data processing capabilities, RFID receivers, games consoles, electronic notepads, laptop computers, global positioning system (GPS) receivers or other programmable data processing devices. Note that in each embodiment, various operations are performed by dedicated circuits (for example, individual logic gates interconnected to perform specific functions) implemented using program instructions (software), or by logic blocks or program modules executed by one or more processors. Examples of "one or more processors that execute logic blocks or program modules" may include one or more microprocessors, a central processing unit (CPU), an application specific integrated circuit (ASIC), a digital signal processor (DSP), a programmable logic device (PLD), a field programmable gate array (FPGA), a processor, a controller, a microcontroller, a microprocessor, an electronic device, or another device designed to perform the functions described herein, and/or any combination of these. The embodiments described herein are implemented, for example, using hardware, software, firmware, middleware, microcode, or any combination of these. Instructions may be program code or code segments for performing the required tasks. The instructions can be stored in a machine-readable non-transitory storage medium or another medium. Code segments may represent any combination of procedures, functions, subprograms, programs, routines, subroutines, modules, software packages, classes or instructions, data structures or program statements. Code segments transmit and/or receive information, data arguments, variables or stored content from and/or to other code segments or hardware circuits, and in this way, connect to other code segments or hardware circuits.

Note that a system is disclosed herein as having various modules and/or units that perform specific functions. These modules and units are illustrated in a schematic manner in order to briefly illustrate their functionality and do not necessarily represent specific hardware and/or software. In that sense, these modules, units, and other components may be hardware and/or software implemented to substantially perform the specific functions described herein. The various functions of the different components may be any combination of hardware and/or software or hardware and/or software used in isolation, and can be used separately or in any combination. Thus, various aspects of the contents of the present disclosure can be implemented in many different ways, all of which are included within the scope of the present disclosure.

REFERENCE SIGNS 10 electronic device
11 image-capturing unit
12 line-of-sight detector
13 memory
14 controller
15 first estimator
16 external device
17 second estimator
18 information processing device
19 acquiring unit
20 mobile object
21 output unit
22 third estimator
24 fourth estimator
25 fifth estimator
IM image
LS line of sight
MP1 first heat map
PE position corresponding to direction of line of sight
RT path of line of sight

The invention claimed is:
1. An electronic device comprising:
an image-capturing unit configured to generate an image corresponding to a view by performing image capturing;
a line-of-sight detector configured to detect a line of sight of a subject with respect to the view; and a controller configured to estimate an alertness level of the subject based on the image and the line of sight,
wherein the controller
functions as a first estimator constructed based on learning data obtained by machine learning a relationship between a learning image and a line of sight of a training subject with respect to the learning image when an alertness level of the training subject is in a first range and configured to generate, based on the image, a first heat map representing a probability of the line of sight being at each position in the image when the alertness level is in the first range,
calculates the alertness level of the subject based on the first heat map and the line of sight of the subject,
functions as one or more estimators constructed based on learning data obtained by machine learning, for each of one or more ranges other than the first range, a relationship between a learning image and a line of sight of a training subject with respect to the learning image when an alertness level of the training subject is in each of the one or more ranges and capable of estimating, based on the image and for each of the one or more ranges, a heat map representing a probability of the line of sight being at each position in the image when the alertness level is included in each of the one or more ranges, and
calculates the alertness level of the subject based on the first heat map and the heat map.

2. The electronic device according to claim 1,
wherein the first estimator
is constructed based on learning data obtained by machine learning, for each of one or more ranges other than the first range, a relationship between a learning image and a line of sight of a training subject with respect to the learning image when an alertness level of the training subject is in each of the one or more ranges and is capable of estimating, based on the image and for each of the one or more ranges, a heat map representing a probability of the line of sight being at each position in the image when the alertness level is included in each of the multiple ranges, and
the controller calculates the alertness level of the subject based on the multiple heat maps.

3. The electronic device according to claim 1,
wherein the controller calculates the alertness level of the subject based on multiple continuously captured images and the line of sight for each of the multiple images.

4. The electronic device according to claim 3,
wherein the controller calculates the alertness level of the subject by excluding combinations of lines of sight and images for which a speed of movement of the line of sight exceeds a threshold among the multiple continuously captured images and the lines of sight for the images.

5. An information processing device comprising:
an acquiring unit configured to acquire an image corresponding to a view and a line of sight of a subject with respect to the view;
a controller configured to estimate an alertness level of the subject based on the image and the line of sight; and
an output unit configured to output the alertness level,
wherein the controller
functions as a first estimator constructed based on learning data obtained by machine learning a relationship between a learning image and a line of sight of a training subject with respect to the learning image when an alertness level of the training subject is in a first range and configured to generate, based on the image, a first heat map representing a probability of the line of sight being at each position in the image when the alertness level is in the first range,
calculates the alertness level of the subject based on the first heat map and the line of sight of the subject,
functions as one or more estimators constructed based on learning data obtained by machine learning, for each of one or more ranges other than the first range, a relationship between a learning image and a line of sight of a training subject with respect to the learning image when an alertness level of the training subject is in each of the one or more ranges and capable of estimating, based on the image and for each of the one or more ranges, a heat map representing a probability of the line of sight being at each position in the image when the alertness level is included in each of the one or more ranges, and
calculates the alertness level of the subject based on the first heat map and the heat map.

6. An alertness level calculating method comprising:
generating an image corresponding to a view by performing image capturing;
detecting a line of sight of a subject with respect to the view; and
estimating an alertness level of the subject based on the image and the line of sight,
wherein estimating the alertness level includes:
using learning data obtained by machine learning a relationship between a learning image and a line of sight of a training subject with respect to the learning image when an alertness level of the training subject is in a first range, estimates, based on the image, a first heat map representing a probability of the line of sight being at each position in the image when the alertness level is in the first range,
calculating the alertness level of the subject based on the first heat map and the line of sight of the subject,
functioning as one or more estimators constructed based on learning data obtained by machine learning, for each of one or more ranges other than the first range, a relationship between a learning image and a line of sight of a training subject with respect to the learning image when an alertness level of the training subject is in each of the one or more ranges and capable of estimating, based on the image and for each of the one or more ranges, a heat map representing a probability of the line of sight being at each position in the image when the alertness level is included in each of the one or more ranges, and
calculating the alertness level of the subject based on the first heat map and the heat map.

7. A non-transitory computer-readable recording medium including an alertness level calculating program configured to cause a computer to function as:
an image-capturing unit configured to generate an image corresponding to a view by performing image capturing;
a line-of-sight detector configured to detect a line of sight of a subject with respect to the view; and
a controller configured to estimate an alertness level of the subject based on the image and the line of sight,
wherein the controller
functions as a first estimator constructed based on learning data obtained by machine learning a relationship between a learning image and a line of sight of a training subject with respect to the learning image when an alertness level of the training subject is in a first range and configured to generate, based on the image, a first heat map representing a probability of the line of sight being at each position in the image when the alertness level is in the first range, calculates the alertness level of the subject based on the first heat map and the line of sight of the subject, functions as one or more estimators constructed based on learning data obtained by machine learning, for each of one or more ranges other than the first range, a relationship between a learning image and a line of sight of a training subject with respect to the learning image when an alertness level of the training subject is in each of the one or more ranges and capable of estimating, based on the image and for each of the one or more ranges, a heat map representing a probability of the line of sight being at each position in the image when the alertness level is included in each of the one or more ranges, and calculates the alertness level of the subject based on the first heat map and the heat map.

* * * * *